(12) United States Patent
Landry

(10) Patent No.: US 7,736,105 B2
(45) Date of Patent: Jun. 15, 2010

(54) PICKUP TRUCK WINDOW, BED, AND CAB PROTECTOR

(76) Inventor: Chad James Landry, 3575 Grand Point Hwy., Breaux Bridge, LA (US) 70517

(*) Notice: Subject to any disclaimer, the term of this patent is extended or adjusted under 35 U.S.C. 154(b) by 462 days.

(21) Appl. No.: 11/940,030

(22) Filed: Nov. 14, 2007

(65) Prior Publication Data

US 2009/0123248 A1     May 14, 2009

(51) Int. Cl.
*B60P 7/08* (2006.01)
(52) U.S. Cl. .................. 410/7; 410/4; 410/94; 410/121
(58) Field of Classification Search .............. 410/3, 410/4, 7, 9, 10, 11, 18, 19, 22, 23, 94, 106, 410/121; 296/3; 224/403, 404, 532; 280/748
See application file for complete search history.

(56) References Cited

U.S. PATENT DOCUMENTS

| | | | |
|---|---|---|---|
| 3,861,736 A | 1/1975 | Rossler | |
| 4,564,216 A | 1/1986 | Kinyon et al. | |
| 4,611,824 A | 9/1986 | McIntosh | |
| 4,953,908 A | 9/1990 | Dondlinger | |
| 5,035,458 A | 7/1991 | Boensch | |
| 6,036,417 A * | 3/2000 | Weaver | 410/7 |
| 7,121,585 B2 | 10/2006 | Cole | |
| 2003/0011180 A1 | 1/2003 | Coffman et al. | |
| 2005/0093320 A1 | 5/2005 | Brauer et al. | |

\* cited by examiner

*Primary Examiner*—Stephen Gordon
(74) *Attorney, Agent, or Firm*—Law Office of Jesse D. Lambert, L.L.C.

(57) ABSTRACT

A pickup truck cab, rear window, and bed protector, referred to herein as a "cab and bed protector," particularly suitable when transporting four wheelers or all terrain vehicles (ATVs) in the bed of a pickup truck. In a presently preferred embodiment, the cab and bed protector can be mounted in the bed of a variety of pickup truck models and is easily removable. The present invention serves as a shield to arrest the forward movement of the ATV during sudden stops, to prevent damage to the truck bed, cab, and/or rear window, and protect the passengers from harm. The preferred embodiment incorporates a plate fixed to a frame to transfer forces imposed on the plate by the ATV to the front wall of the truck bed, preventing damage to either the truck or the ATV.

10 Claims, 4 Drawing Sheets

PICKUP TRUCK WINDOW, BED, AND CAB PROTECTOR

CROSS REFERENCE TO RELATED APPLICATIONS

Not applicable.

BACKGROUND

1. Field of the Invention

The present invention relates to cab and bed protectors designed for mounting in the bed of pickup trucks in order to prevent damage to the truck, including denting of the truck bed and cab, and breakage of the rear truck cab windows, and additionally to prevent injury to occupants of the cab, in the event that a load in the truck bed shifts toward the front of the truck. More particularly, the present invention pertains to cab and bed protectors capable of mounting on a variety of pickup truck models and easily removable, nonpermanent cab and bed protectors.

2. Related Art

Pickup trucks have proven to be desirable vehicles due to their versatile utility, in particular their ability to haul cargo of varied types. The variety in shapes and sizes of cargo carried in a pickup truck often make it difficult to secure the load, which can result in damage to the truck's bed or cab or injury to its passengers. In particular, four wheelers, all terrain vehicles (ATVs), motorcycles, lawnmowers, and similar cargo can be difficult to restrain. For exemplary purposes only, the present invention will be described in connection with the carrying of ATVs in truck beds, although it is understood that the invention has utility in connection with hauling any type of load or cargo in any truck or cargo-carrying vehicle. When a truck carrying an ATV slows suddenly or stops, and when the ATV is being driven up into the bed when loading, there is a risk of the ATV hitting the front of the truck bed, cab, or rear window, damaging same. The present invention serves as a "shield" or blocking device, to arrest forward movement of the ATV, and prevent such damage to the truck and possibly the ATV. For exemplary purposes only, the present invention will be referred to herein as a "cab and bed protector," although it is understood that the invention relates to the field of attachments for pickup trucks designed to prevent damage to the truck cab, bed, and/or window, and to prevent injury to cab occupants, which are commonly referred to as headache racks, bed or cab guards, truck protection shields, protective racks, and several other similar terms.

The prior art reveals an evolving field of bed and cab protectors that have been enhanced to solve a variety of problems and there currently exists a wide variety of multifunctional bed and cab protectors. For example, U.S. Pat. No. 4,611,824 issued to Thomas K. McIntosh on Sep. 16, 1986 discloses a bed and cab protector including a rigid screen structure having two ends which was alternatively mountable for a wide-bed pickup truck and a mini-pickup truck. This basic design has been fitted with tie down clips for securing cargo, adjustable louvers to reduce heat radiation, and brackets for mounting lights and other accessories. Cab and bed protectors have also been strengthened to protect passengers in the event of a rollover and expanded to accommodate elongated cargo such as ladders or pipes.

While the related art cab and bed protectors may be suitable for the multitude of purposes to which they are intended to address, there is still a need for a cab and bed protector to arrest the forward movement of an ATV or other cargo, that can be mounted to a variety of pickup truck models and can be easily removed from the same. The present invention distinguishes itself from the prior art in cab and bed protectors by providing a universal, demountable cab and bed protector with virtually no obstruction of vision through the rear window.

DESCRIPTION OF THE PRESENTLY PREFERRED EMBODIMENT(S)

With reference to the drawings, some of the presently preferred embodiments of the present invention can now be described. It is to be understood that various changes can be made to the invention, without departing from the scope thereof.

Figure 1:
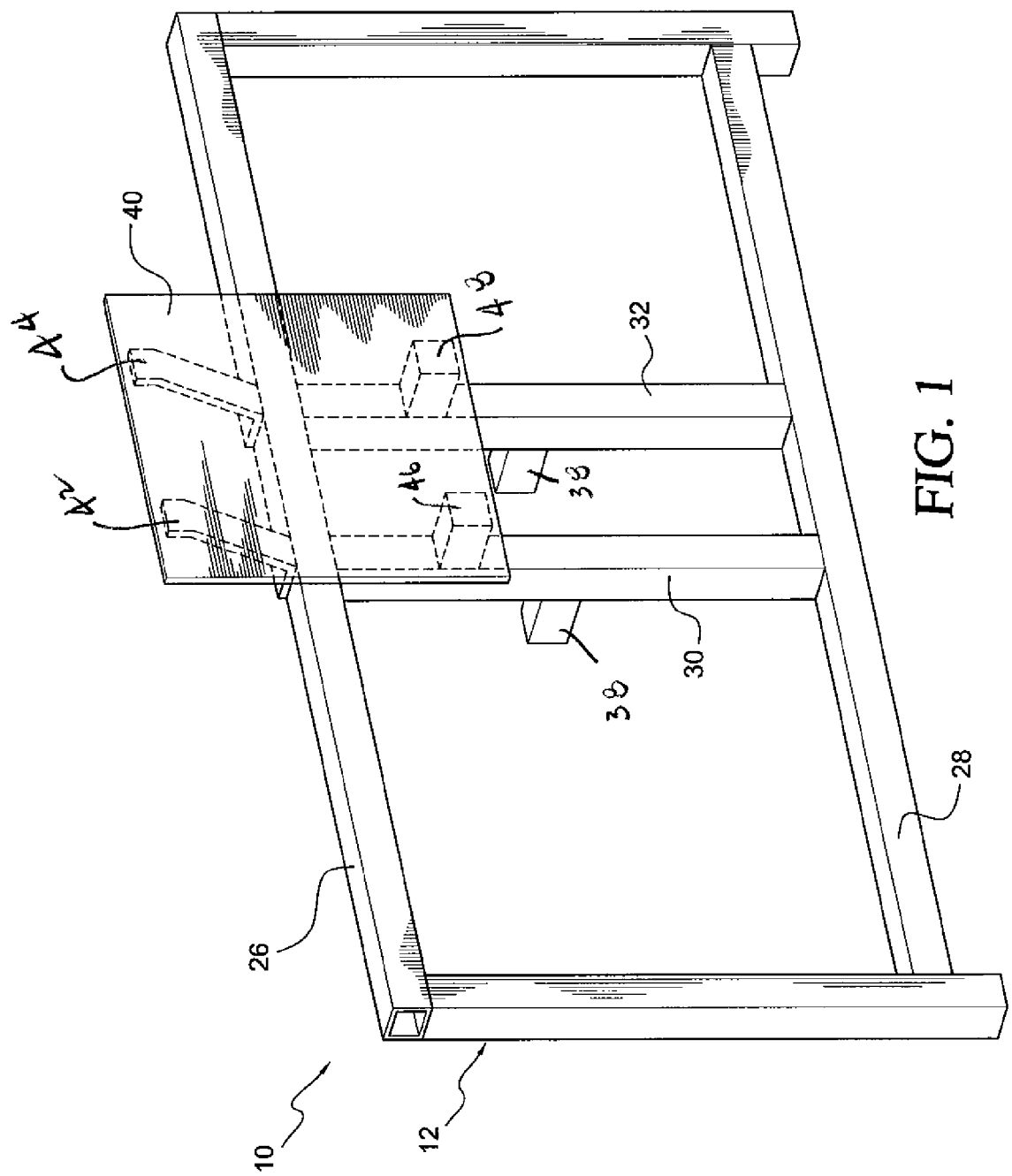
FIG. 1 is a perspective view of the present invention, dismounted from a truck bed, for clarity.
Figure 2:
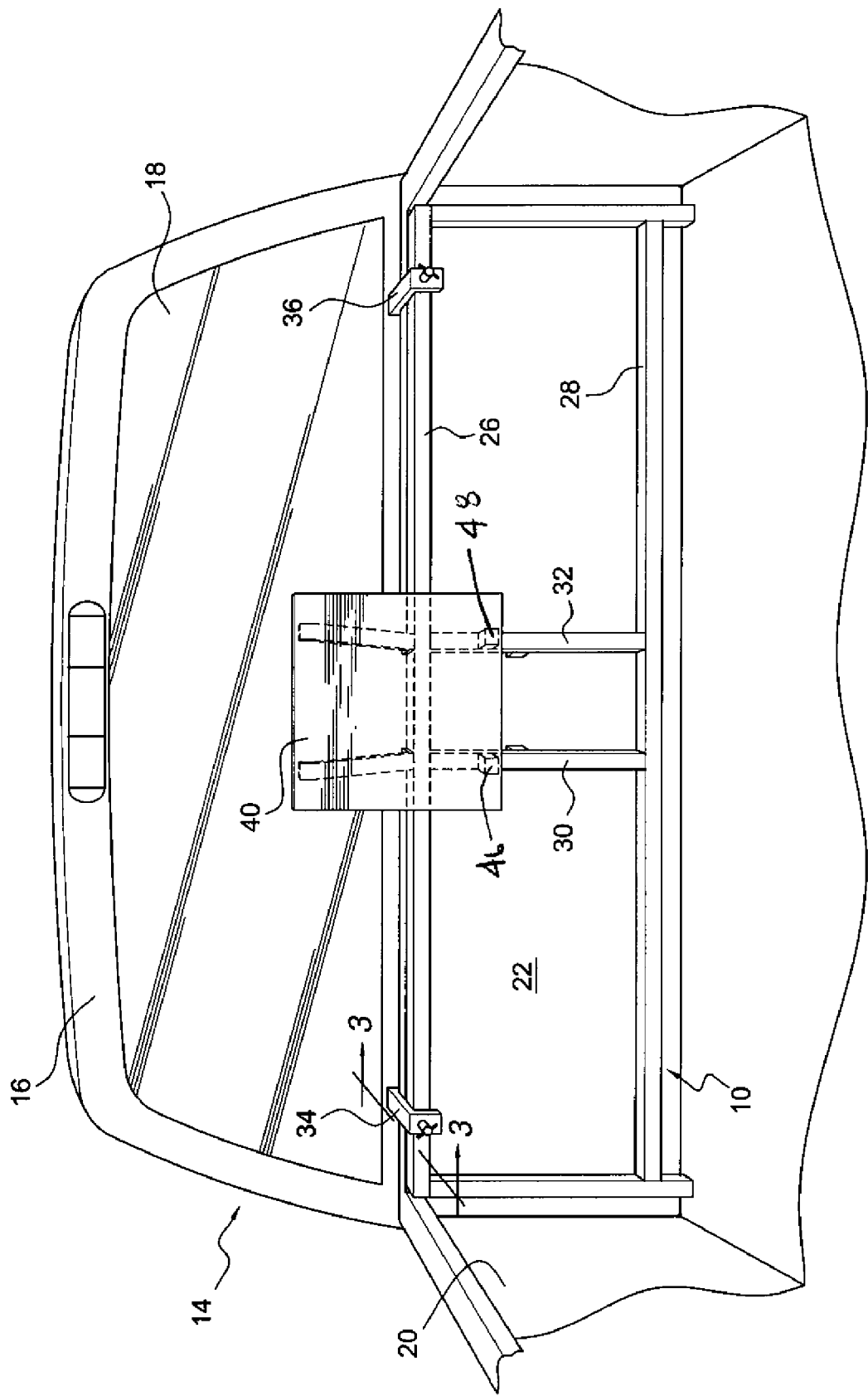
FIG. 2 is a view of the present invention mounted in a truck bed, looking toward the front of the truck.
Figure 3:
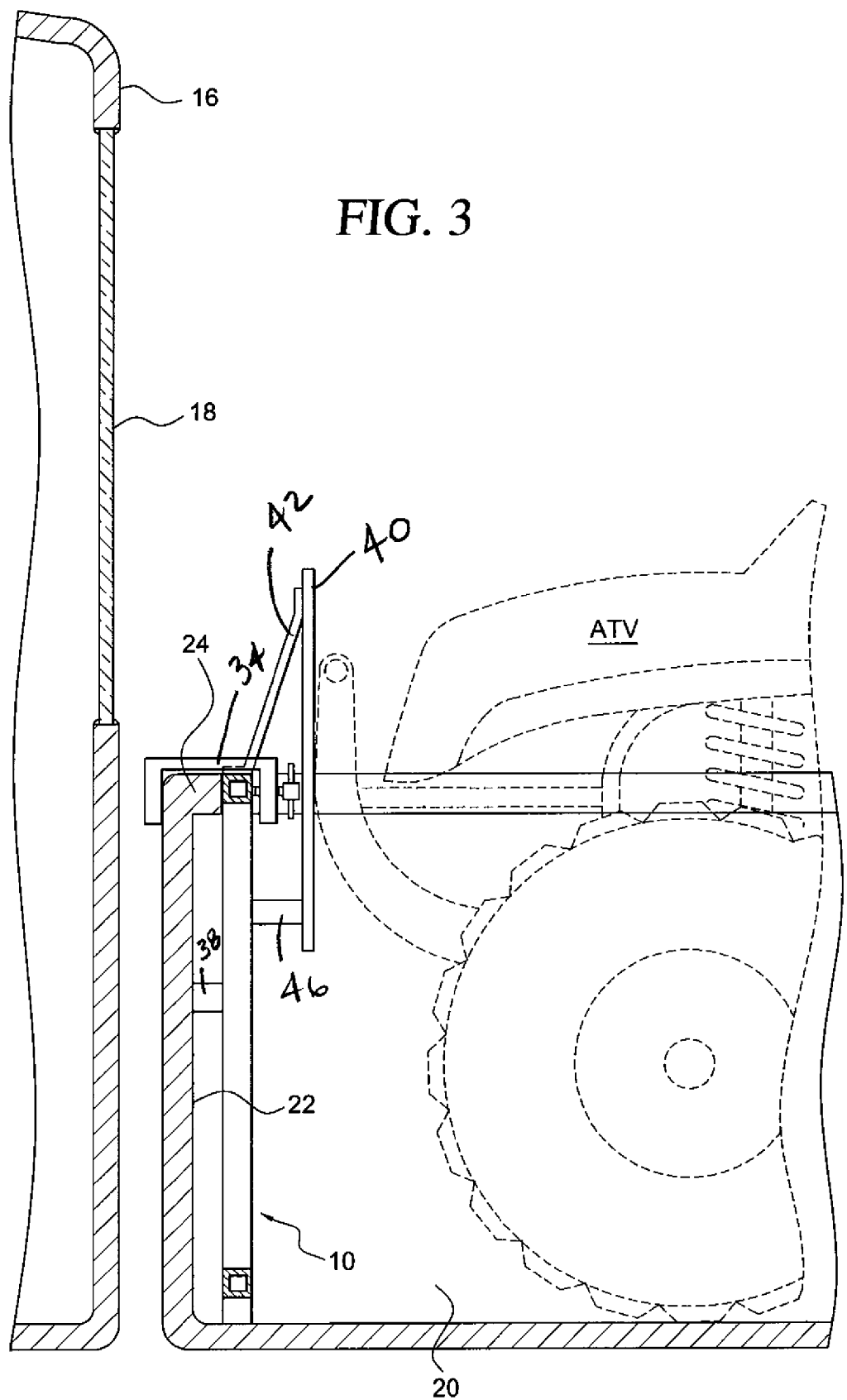
FIG. 3 is a side view in partial cross section of the present invention, mounted in a truck bed, with an exemplary ATV shown in phantom.

As can be seen in FIGS. 1-3, a presently preferred embodiment of the cab and bed protector 10, FIG. 1, is mounted to a conventional pickup truck 14 (see FIGS. 2 and 3) having a passenger cab 16 with a rear window 18, and a bed 20 having a front wall 22 and a front upper frame rail 24.

Cab and bed protector 10 includes a frame 12 having generally horizontal upper and lower frame members 26 and 28, both extending horizontally across the width of the bed. Upper and lower frame members 26 and 28 are connected by a pair of parallel cross members 30 and 32 extending generally vertically between upper and lower frame members 26 and 28. It is understood that cross members 30 and 32 could be at some angle other than a right angle to upper and lower frame members 26 and 28 (that is, could be other than vertically oriented). Frame 12 is preferably made of metal, such as square hollow structural aluminum, and is attached to bed 20 using a means for mounting. In the preferred embodiment, said means for mounting may comprise C-Clamps 34 and 36, although it is understood that other means for mounting may be used, for example nuts and bolts, other clamping configurations, etc. Frame 12 also includes support members 38, extending generally perpendicularly from the plane of the frame to the interior surface of front wall 22, to transfer forces to the front wall 22.

Cab and bed protector 10 transfers the forces imposed on a rearwardly facing plate 40 by an ATV or other cargo being carried in bed 20, to frame 12, and ultimately to front wall 22. Plate 40 is fixed to frame 12, located generally in the center with respect to the width of bed 20, at a suitable height above the floor of the bed to contact the nose of an ATV (as can best be seen in FIG. 3), and spaced apart from and generally coplanar to front wall 22. As seen in the figures, plate 40 is fixed to frame 12 by a pair of connection members 42 and 44 extending from upper horizontal frame member 26 to plate 40 and a pair of connection members 46 and 48 extending from each respective vertical cross members 30 and 32 to plate 40.

Plate 40 may be sized as desired, and may have any of a number of desired shapes, e.g. square, rectangular, and circular, etc. Plate 40 may be made of structural aluminum, preferably coated with a resilient material, and may be welded or connected by other means well known in the art to connection members 42, 44, 46 and 48, which can preferably be made of metal, such as hollow square structural aluminum. Similarly, connection members 42, 44, 46, and 48 and support members 38 may be welded or similarly attached to the respective horizontal or vertical frame members 26, 28, 30, and 32. Also, upper and lower horizontal frame members 26, 28 may be welded to vertical frame members 30, 32.

Furthermore, support members 38 may be coated with a resilient material or capped with a suitable material to prevent damage to front wall 22.

Figure 4:
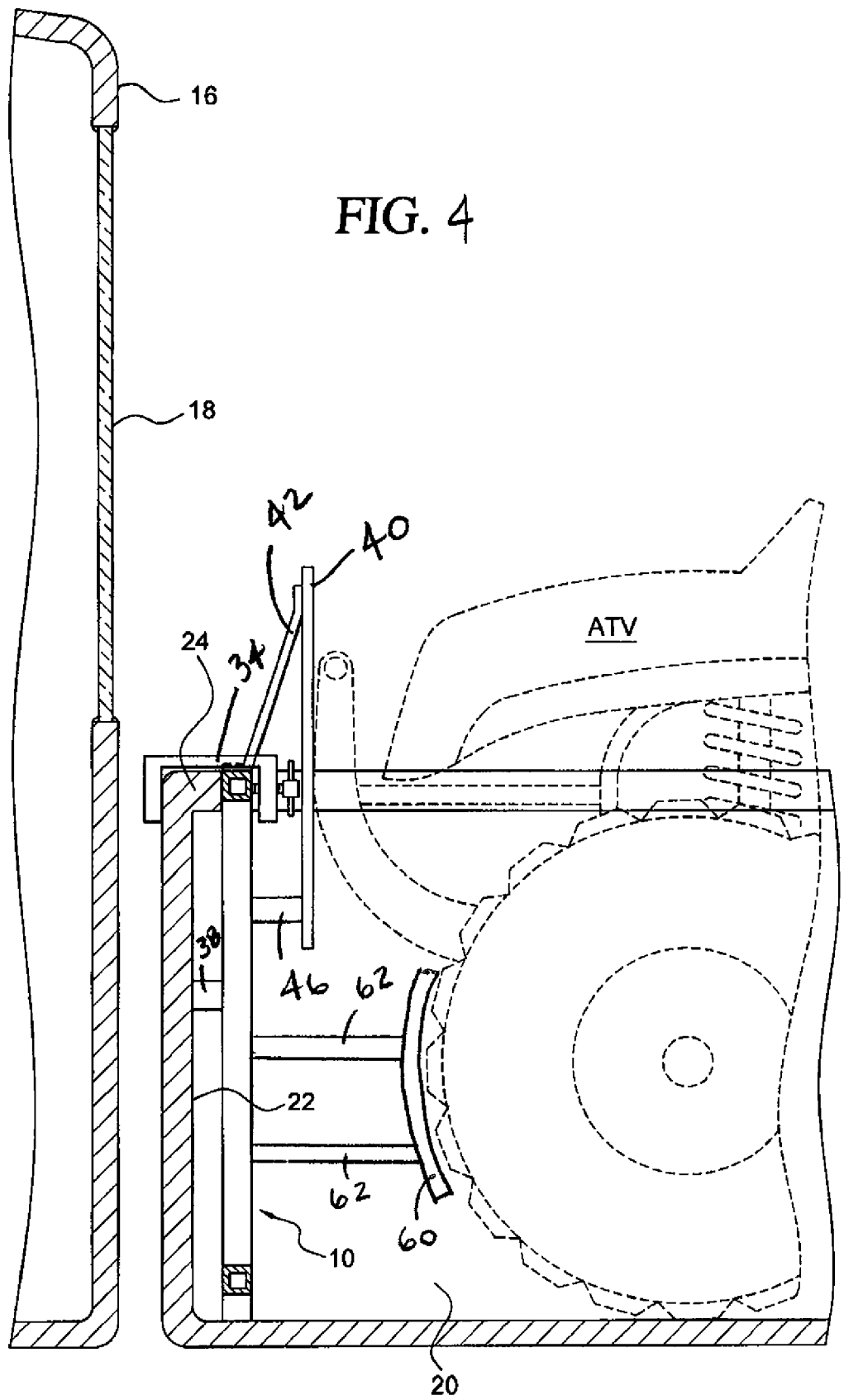
FIG. 4 is a side view of another embodiment of the present invention.

Another embodiment of the present invention accommodates loads (especially certain configurations of ATVs and the like) with front-end configurations which could be damaged by contact with a plate member positioned so as to contact the front end of the load. FIG. 4 shows an example of this embodiment. Secondary plate member 60 is connected to frame 12 by members 62. Preferably, secondary plate member 60 is positioned so as to contact the front wheels or tires (which will be collectively referred to as tires) of a wheeled vehicle, so that the arresting force is applied not to the front end of the load, but to the tires. It is understood that the invention may comprise secondary plate member 60 in addition to plate 40, or in lieu thereof. More generally, one or more secondary plate members 60 can be mounted and positioned to contact any desired part of a load, whether it be a tire or some other part capable of taking a restraining force.

While the preceding description contains many specificities, it is to be understood that same are presented only to describe some of the presently preferred embodiments of the invention, and not by way of limitation. Changes can be made to various aspects of the invention, without departing from the scope thereof. For example, various materials can be used to make the device. Structural aluminum is shown, but steel or other metals, and possibly high-strength composites, are also suitable. The various elements of the invention may be joined by welding, bolting, screwing together, or other means known in the art. The number and placement of the upper and lower frame members can be varied, e.g. more than two such members can be used if desired, and likewise more than two cross members could be used. Depending upon the particular size and shape of the loads being carried, plate 40 could be positioned at differing positions both horizontally and vertically within the truck bed.

Therefore, the scope of the present invention is to be measured not by the foregoing exemplary disclosure, but by the appended claims and their legal equivalents.

I claim:

1. A rear window, bed, and cab protector for a pickup truck having a bed behind a cab, the cab having a rear window, comprising:
   a. a removable frame disposed within said bed, proximal to and contacting a front wall of said bed, said frame comprising a plurality of support members extending from a plane of said frame to an interior surface of said front wall of said bed, to transfer forces from said frame to said bed wall;
   b. a means for mounting said frame to said bed; and
   c. a plate attached to said frame, spaced apart from said front wall of said bed and generally coplanar to said front wall of said bed, said plate facing rearwardly and disposed at a position above a floor of said bed suitable to arrest forward movement of objects carried in said bed.

2. The rear window, bed, and cab protector of claim 1 wherein said frame comprises upper and lower horizontal members connected by a plurality of vertical cross members.

3. The rear window, bed, and cab protector of claim 2 wherein said plate is connected to said frame by at least two connection members.

4. The rear window, bed, and cab protector of claim 2 wherein said plate is connected to said frame by at least two connection members connecting said vertical cross members to said plate.

5. The apparatus of claim 2 wherein said means for mounting comprises a plurality of C-clamps which hook over said front wall of said bed and over said frame.

6. The rear window, bed, and cab protector of claim 1 wherein said frame and said plate are made of aluminum.

7. The rear window, bed, and cab protector of claim 1 wherein said plate and said support members are coated with a resilient material.

8. The rear window, bed, and cab protector of claim 1, further comprising a secondary plate member attached to said frame, said secondary plate member positioned so as to contact a desired portion of a load carried in said bed.

9. The rear window, bed, and cab protector of claim 8, wherein said secondary plate member is positioned so as to contact tires of a wheeled vehicle carried in said bed.

10. A rear window, bed, and cab protector for a pickup truck having a bed behind a cab, the cab having a rear window, comprising:
   a. a removable frame disposed within said bed, proximal to and contacting a front wall of said bed, said frame comprising a plurality of support members extending from a plane of said frame to an interior surface of said front wall of said bed, to transfer forces from said frame to said bed wall;
   b. a means for mounting said frame to said bed; and
   c. a secondary plate attached to said frame, spaced apart from said front wall of said bed and disposed at a position above a floor of said bed suitable to contact tires of a wheeled vehicle carried in said bed.

* * * * *